Nov. 11, 1924.

W. H. KEYS

INDICATOR

Filed Nov. 21, 1923

1,515,122

Inventor:
William H. Keys,
by Rippey Kingsland
His Attorneys.

Patented Nov. 11, 1924.

1,515,122

UNITED STATES PATENT OFFICE.

WILLIAM H. KEYS, OF CLAYTON, MISSOURI, ASSIGNOR OF ONE-HALF TO OWEN J. SULLIVAN, OF UNIVERSITY CITY, MISSOURI.

INDICATOR.

Application filed November 21, 1923. Serial No. 676,024.

*To all whom it may concern:*

Be it known that I, WILLIAM H. KEYS, a citizen of the United States, residing at the city of Clayton, St. Louis County, Missouri, have invented a new and useful Indicator, of which the following is a specification.

This invention relates to indicators, and more particularly to an indicator adapted to be mounted on the instrument board of an automobile to indicate the mileage at which the oil was changed and also to indicate the date that the battery was inspected.

An object of the invention is to provide an indicator that may be conveniently mounted on the instrument board of an automobile and readily set to indicate the mileage at which the oil was changed and also to indicate the date upon which the battery was inspected.

Additional objects will appear from the following description taken in connection with the accompanying drawing in which—

Figure 1:
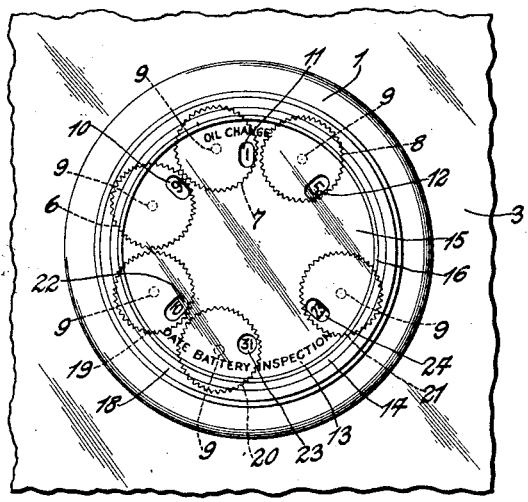
Fig. 1 is a face view of the indicator with the dial wheels shown in outline to indicate the arrangement thereof.
Figure 2:
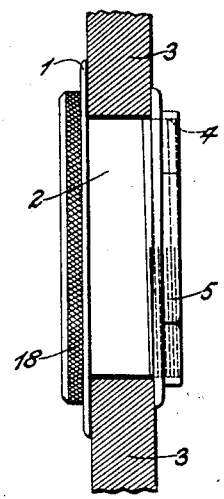
Fig. 2 is a side elevation.

In the embodiment of the invention illustrated in the drawing the case is shown as including a back plate 1 having a circular flange 2 projecting from the back wall thereof. The circular flange is adapted to project through an opening in the instrument board 3. The projecting edge of the flange 2 is threaded at 4 to receive a flanged retaining ring 5 thereby providing means for removably holding the indicator in place on the instrument board of the automobile.

Figure 3:
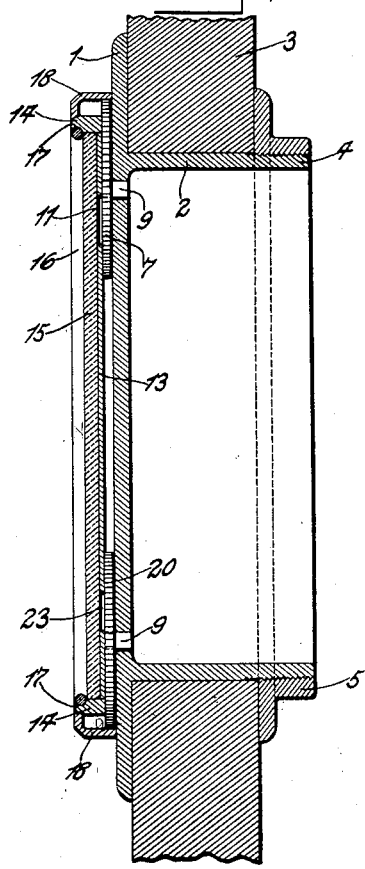
Fig. 3 is a vertical section taken through the instrument.

A series of dial wheels 6, 7 and 8 are mounted on the outer side of the back plate 1 near the upper portion thereof, short stud shafts 9 being provided for that purpose, said shafts carrying the wheels and being journaled in openings in the back plate as clearly shown in Fig. 3 of the drawing. These dial wheels are provided with a series of numerals beginning with zero and ending with nine. The edges of the wheels are serrated so that they may be conveniently manipulated to be set to bring the proper numerals into view through openings 10, 11 and 12, respectively in a dial plate 13, the dial plate being set against the face of the wheels within a retaining circular flange 14 carried by the back plate 1. Adjacent to the series of openings 10, 11 and 12 are the words "Oil changed" to indicate that the upper series of numerals designates the mileage at which oil in the automobile has been renewed or changed.

Over the dial plate 13 is mounted a glass cover 15, said cover being retained in place by an expanding ring 16 that seats in an internal groove 17 formed in the internal wall of the flange 14.

It will be noted that the dial wheels 6, 7 and 8 are so disposed on the back plate that their edge project through openings in the flange 14, thereby providing means for manually turning the dial wheels to the proper adjustment.

In order to obtain access to the dial wheels for manipulation and also to prevent accidental movement of the dial wheels after they have been set, a removable ring 18 is provided, said ring being arranged to fit over the periphery of the flange 14. The ring 18 engages the outer edges of the dial wheels and is slightly distorted to cause the inner edge of the ring to contact with the flange 14. The distortion of the ring and the frictional contact thereof with the dial wheels hold the ring 18 in place.

In the lower part of the indicator is a second series of dial wheels 19, 20 and 21, likewise carried by the back plate on shafts 9. The dial wheel 19 is arranged with a series of numbers running from one to twelve, providing the month date. The dial wheel 20 is provided with a series of numbers running from one to thirty-one and constitutes the day indicator, and the dial wheel 21 is arranged with a series of numbers to indicate the year. These dial wheels 19, 20 and 21 are similarly disposed to the wheels 6, 7 and 8 so that the peripheries thereof will extend through openings in the flange 14 for manipulation when the ring 18 is removed. The numerals on the dial wheels 19—20 and 21 are arranged to register in a series of openings 22, 23 and 24 respectively in the dial plate. The dial plate carries adjacent to the series of openings the words "Date battery inspection," thus providing an indicator for designating the date upon which the battery was inspected.

In the operation of an automobile it is important to know the mileage at which the oil was changed, and also the date upon which the battery was inspected, the change in oil being controlled by the mileage and the battery inspection being necessary for efficient maintenance at periodical times.

The instrument of the invention provides a convenient means for recording the mileage at which the oil was changed. When the change of oil is made the upper series of dial wheels are set to correspond with the three last figures on the speedometer reading as to mileage. This is done by removing the ring 18 and setting the dial wheels, after which the ring is replaced and the indicator remains set so that it is an easy matter for the operator to determine by coordinating the reading of the indicator with the speedometer reading when it is necessary to again change the oil.

The lower set of indicators is likewise set to indicate the date upon which the battery was inspected, thus preserving a record to determine when the periodical time has expired for re-inspection of the battery.

It is obvious that the invention may be conveniently mounted on the instrument board of an automobile and that it may be readily operated to attain the purposes stated.

What I claim and desire to secure by Letters Patent is:—

1. An instrument of the class described, comprising a case adapted to be mounted on the instrument board of an automobile, a series of independently settable dial wheels carried in the case arranged for manual operation, a stationary dial plate having a series of openings therein to cooperate with the respective dial wheels, and a removable ring covering the edges of the dial wheels and permitting access thereto for manipulation.

2. A device of the class described, comprising a case composed of a back plate and an annular flange on the front face of said back plate, in combination with a series of independently settable dial wheels mounted for rotation on said back plate, a stationary dial plate mounted over said wheels and being provided with a series of openings therein for displaying the numerals on said wheels, a removable ring to permit access to the dial wheels for manual operation, and means in connection with the back plate for securing the instrument to the instrument board of an automobile.

3. A device of the class described, comprising a case, a dial plate fixed within the case having two series of openings therein, series of independently settable dial wheels provided with suitable characters on the face thereof arranged in the case so that selected ones of said figures may be displayed through the openings in the dial plate, one of said series of openings and one series of dial wheels constituting an indicator to indicate the mileage of oil change and the other of said series of openings and series of dial wheels being arranged to indicate the date of battery inspection.

4. A device of the class described, comprising a back plate having means in connection therewith for mounting the same on the instrument board of an automobile, a circular flange formed integral with the front face of said back plate constituting the side walls of the case, a series of dial wheels rotatably mounted on the back plate and having the peripheries thereof extending through openings in said flange, a dial plate arranged to be mounted within said flange and having openings to cooperate with the numerals on the dial wheels, a glass cover plate mounted within said flange, and a retaining ring extending over said flange and arranged to cover the projecting edges of the dial wheels.

5. A device of the class described, comprising a back plate having means in connection therewith for mounting the same on the instrument board of an automobile, a circular flange formed integral with the front face of said back plate constituting the side walls of the case, a series of dial wheels rotatably mounted on the back plate and having the peripheries thereof extending through openings in said flange, a dial plate arranged to be mounted within said flange and said dial plate having openings to cooperate with the numerals on the dial wheels, a glass cover plate mounted within said flange, a retaining ring extending over said flange and arranged to cover the projecting edges of the dial wheels, a circular flange on the back plate arranged to extend through an opening in the instrument board, and a threaded ring for engagement therewith to secure the instrument in place.

WILLIAM H. KEYS.